United States Patent [19]
Dillon et al.

[11] Patent Number: 5,260,996
[45] Date of Patent: Nov. 9, 1993

[54] CURRENT LIMITED ELECTRONIC RINGING GENERATOR

[75] Inventors: Philip L. Dillon, Arlington; Gerald W. Beene, Southlake, both of Tex.

[73] Assignee: Reliance Comm/Tec Corporation, Chicago, Ill.

[21] Appl. No.: 624,860

[22] Filed: Dec. 10, 1990

[51] Int. Cl.$^5$ .................. H04M 3/00; H04M 1/00
[52] U.S. Cl. .................. 379/418; 379/164; 379/252; 379/253
[58] Field of Search ............ 379/418, 252, 253, 164

[56] References Cited

U.S. PATENT DOCUMENTS

| | | | |
|---|---|---|---|
| 3,927,266 | 12/1975 | Stewart et al. | 379/418 |
| 4,211,896 | 7/1980 | Ferrieu | 379/253 |
| 4,273,964 | 6/1981 | Szpindel | 379/418 |
| 4,341,928 | 7/1982 | Stanson et al. | 379/418 |
| 4,611,097 | 9/1986 | Grimes | 379/253 |
| 4,656,659 | 4/1987 | Chea, Jr. | 379/253 |

Primary Examiner—James L. Dwyer
Assistant Examiner—Jack Chiang
Attorney, Agent, or Firm—Michael M. Rickin

[57] ABSTRACT

An electronic ringing generator circuit with provision for power efficient current limiting and preservation of sinusoidal or near sinusoidal output waveform under overload conditions. A pulsewidth modulated DC-DC power convertor produces supply voltages for a linear class B power amplifier which has a low frequency low level sinusoidal signal applied to its input through a first controllable attenuator. The DC-DC convertor's reference input is also driven through a second controllable attenuator which is coordinated with the first controllable attenuator. The attenuators are operated in such a way that if the amplifier's output current exceeds a predetermined value, both the input signal and amplifier supply voltages are reduced in a coordinated manner so that simultaneously the output AC waveshape is preserved and the amplifier continues to operate at or very near optimum efficiency. The amplifier may be operated to produce a sinusoidal output (crest factor = 1.41) or a slightly clipped sinewave with a specified minimum crest factor less than 1.41.

11 Claims, 7 Drawing Sheets

CURRENT LIMITED ELECTRONIC RINGING GENERATOR

BACKGROUND OF THE INVENTION

1. Field of the Invention

This invention relates to electronic ringing generators and more particularly to those ringing generators which must generate a waveform which is close to a pure sinusoid over a wide range of output load conditions including overloads.

2. Description of the Prior Art

The ringing generators used in moderate to large sized telephone systems have typically been provided as modules with output power capabilities ranging from 15 volt-amperes (VA) to 50 VA. They have generally provided sinusoidal, or approximately sinusoidal waveforms, especially those with the larger output capabilities. Such generators usually incorporate relatively large and heavy iron core transformers, and are required to tolerate short circuits on their output terminals without sustaining permanent damage. The expense and size of these generators is tolerable because their cost is distributed among a relatively large number of lines, compared to smaller systems. It is also true that in a large system better advantage can be taken of the fact that the probability that a given line will require ringing at a given instant is quite low. Accordingly, in a large system, the average ringing capacity required per line (total ringing capacity required divided by the total number of lines) is quite small.

In smaller telephone systems, e.g., small loop carrier systems, or perhaps small PBX's or key systems, conditions are quite different. Generally, large expensive ringing systems of the type used in central offices cannot be justified, and more extensive use is made of electronic techniques which do not employ large iron core transformers. In the past, these smaller systems have often employed squarewave ringing, which is inherently more power efficient and easier to realize with electronic techniques. In these smaller systems, it is also required that the capability to ring a large percentage of the lines simultaneously, perhaps all of the lines, be provided.

As these systems proliferated, and as data transmission became more prevalent in the telephone plant, it was observed that the steep rise and fall times associated with squarewave ringing coupled noise into other pairs in the telephone outside plant or inside building wiring, causing both audible noise at the ringing frequency and its harmonics, and impulse noise as well, which interfered with the operation of data circuits. In an effort to mitigate these effects, some manufacturers introduced a few milliseconds of slope in the rising and falling edges of their ringing signals, which did greatly relieve the problem.

In recent years, the number of manufacturers of telephones and other station equipment, and the number of different types of telephone station equipment have greatly increased. The traditional electromechanical ringers once characteristic of telephone sets responded satisfactorily to either squarewave or sinewave ringing. Such is not the case, however, with some of the more modern equipment. Many of the newer devices will not respond reliably to waveforms which are not at least reasonably sinusoidal. Many of the newer devices actually detect sharp rise and fall times and inhibit their alerting devices to prevent them from responding to dial pulses and transients.

As a result of the aforementioned difficulties, squarewave ringing is no longer acceptable in new systems. Ringing waveforms are now controlled in the specifications applicable to such systems by a crest factor requirement. Crest factor is defined to be the ratio of the peak voltage of a waveform to its rms value. A pure sinusoid has a crest factor of 1.41; a pure square wave has a crest factor of 1.00. A common requirement currently imposed by telephone companies is that the crest factor be between 1.20 and 1.60. It may be an objective in such systems that the crest factor be between 1.35 and 1.45. This is intended to ensure that the ringing signal will either be very close to a pure sinusoid or a pure sinusoid.

The introduction of optical fiber into the telephone loop plant greatly increases the need for small, reasonably efficient ringing devices with waveforms characterized by well controlled crest factors; sinusoidal ringing is clearly preferred. Fiber to the curb (FTTC) systems typically serve four (4) residences and provide not more than 12 channels, while fiber to the home (FTTH) systems serve only one residence and seldom provide more than three (3) channels. Each such system must be provided with a ringing source, which must be capable of ringing up to three (3) lines simultaneously, with each line being permitted to have as many as five (5) ringers associated with it. Such a ringing device must be capable of delivering approximately 5 VA of output capability with the required crest factor, and with reasonable efficiency.

The ringing device, in general, along with the other power supplies in the local system, may be powered from a power source which is located as much as 12 kilofeet (about 4,375 meters) away from the local system, and is connected to the power source by a cable pair or pairs. When subjected to transient overloads, the ringing device cannot cause other power supplies in the local system to be deprived of sufficient power to continue operating satisfactorily. Therefore, the total power it can take from the power source must be limited, and of course, the device must be capable of being subjected to a short circuit or low resistance fault on its output without sustaining permanent damage. If subjected to an overload due to an excessive number of ringers being rung simultaneously, it must continue to meet its crest factor requirements, even though it is not required to deliver sufficient voltage to ring the excessive ringer load.

To the end of overcoming the aforementioned difficulties associated with the provision of ringing capability in small local telephone systems such as FTTC and FTTH systems, it is an object of the invention to provide a small, reasonably efficient ringing device characterized by a well controlled output crest factor under a wide range of output load conditions. It is a further object of the invention to provide an output current limiting function for the device, which simultaneously preserves the desired crest factor, and allows the device to continue to operate efficiently while such current limiting function is active. It is yet a further object of the invention to make the device capable of being subjected to short circuit or low resistance output faults without sustaining damage. It is yet a further object of the invention to limit the input power taken by the device under overload conditions so that overloads do not result in the malfunction of other power supplies in the local system which are fed from the same power source.

SUMMARY OF THE INVENTION

An electronic generator for providing a ringing signal to a load. The generator comprises a circuit responsive to a reference voltage. In response to the reference voltage, the circuit generates a regulated differential DC voltage at a fixed multiple of the reference voltage. The differential DC voltage is symmetrical about a DC bias voltage. The generator also comprises a circuit which responds to a signal proportional to a predetermined maximum amplitude of current permitted to flow in the load and to a signal proportional to the actual current flowing in the load. This circuit generates a control signal whose amplitude is proportional to the amount by which the signal proportional to the current actually flowing in the load exceeds the signal proportional to a predetermined maximum amplitude of permitted to flow in the load.

The generator further comprises a circuit for providing both a sinusoidal signal having a desired ringing frequency and a predetermined amplitude, and the reference voltage at a predetermined amplitude. The circuit is responsive to the control signal for providing both the sinusoidal signal and the reference voltage at amplitudes attenuated from the associated one of the predetermined amplitudes by an amount proportional to the control signal amplitude.

The generator also comprises a circuit connected to receive the regulated differential DC voltage. The circuit is for amplifying the attenuating means provided sinusoidal signal to provide the ringing signal as an AC signal having a crest factor. The AC signal is symmetrical about the DC bias voltage. The AC signal has:
  i) the crest factor equal to first predetermined crest factor and a predetermined amplitude when the sinusoidal signal and the reference voltage both have an associated one of the predetermined amplitudes; and
  ii) the crest factor which may be less than the first predetermined crest factor but greater than a second predetermined crest factor and an amplitude which is reduced from the predetermined amplitude when the sinusoidal signal and the reference voltage both have the attenuated amplitudes.

DESCRIPTION OF THE PREFERRED EMBODIMENT

Figure 1:
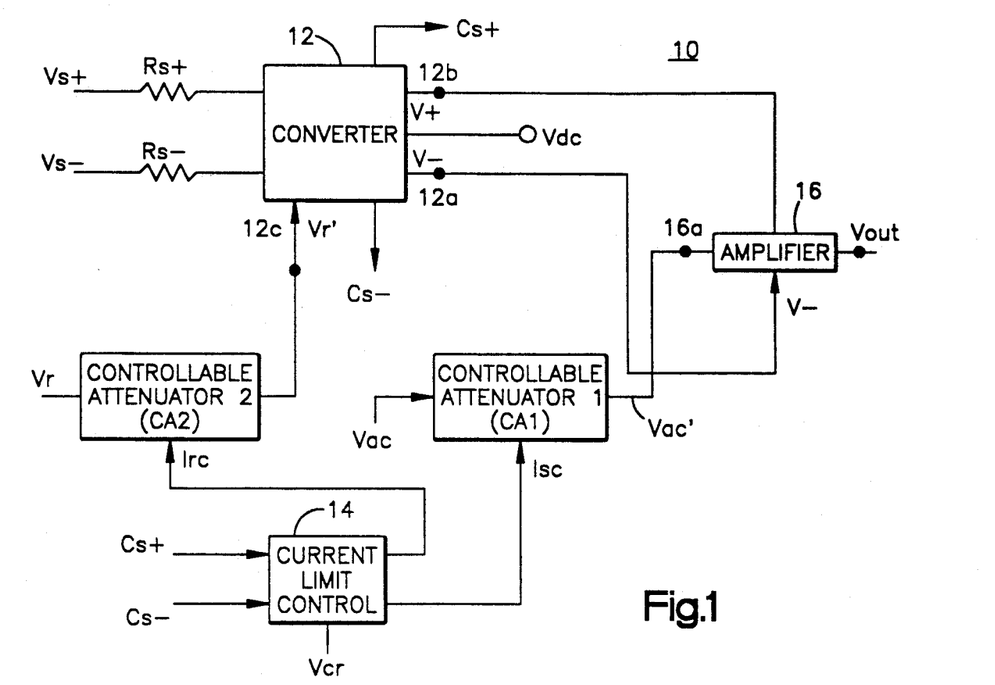
FIG. 1 is a block diagram of the ringing generator of the present invention.

FIG. 1 shows a block diagram for the ringing device or generator 10 of the present invention. In FIG. 1, Vs+ and Vs− are the output voltages of a power source (not shown), which may be remotely located from the generator. The resistors, Rs+ and Rs−, represent the resistances of the conductors through which the power source voltage is connected to DC-DC convertor 12 of the ringing device, and to the other power supplies fed from the same power source, which may exist in the same local system wherein ringing device 10 is located. It will be appreciated that in general either or both resistors may be short circuits, and that one of the voltages Vs+ and Vs−, may be ground potential.

In order to provide a better understanding of the operation of ringing device 10, the parameters associated with one embodiment of the present invention will be used hereinafter. That embodiment will be referred to as the "one embodiment". Those parameters are illustrative only of the one embodiment and should not be used to limit the scope of our invention. In the one embodiment, the power source output voltages Vs+ and Vs− are +130 Vdc and −130 Vdc respectively, and the resistances of resistors Rs+ and Rs− are approximately equal, and range from zero to 300 ohms or more each.

An essential requirement imposed on converter 12 is the ability of the convertor to decrease its output voltage without increasing its power dissipation. This is a characteristic of most switched mode convertors operated without series pass regulators. While a conventional pulsewidth modulated flyback convertor was used to embody DC-DC convertor 12 in the one embodiment, other types of conventional convertors well known to those skilled in the art which provide the same functionality can be used for convertor 12.

The convertor 12, of course, contains internal feedback loops (not shown) for purposes of regulating the differential voltage (V+ and V−) at its outputs 12a, 12b and limiting the current of its switching transistor (not shown). The convertor regulates its differential output voltage, and maintains that voltage at a fixed multiple of its input reference voltage Vr'. The voltage Vr' is fed to the convertor through a controllable attenuator CA2.

In the one embodiment, the nominal differential voltage at outputs 12a, 12b is 230 V, the nominal value of Vr' is 2.30 V, and the fixed multiple is 100. The output voltage of the convertor is referred, by center tapped connection to its output transformer (not shown), to the DC voltage Vdc on which the ringing signal is to be superimposed. In the one embodiment, the value of Vdc is −50 V, and consequently, the ground referenced values of V+ and V− are +65 Vdc and −165 Vdc, respectively. The convertor also has two current sense output signals CS+ and CS− which are inputs to the current limiting control circuit 14.

The convertor's output voltages V+ and V− are used to power the ringing amplifier 16, which has a low level sinusoidal AC signal at the ringing frequency delivered to its input 16a through a controllable attenuator CA1. Amplifier 16 is operated Class B. In the one embodiment, the amplifier operates with a voltage gain of 50 and produces an output voltage of 75 Vrms when producing a pure sinusoidal output. Accordingly, the voltage of the input sinewave, under nominal conditions, is 1.50 Vrms. In the one embodiment, the frequency of the sinewave is nominally 20 Hz. Amplifier 16 is internally biased so that its output voltage is centered about −50 Vdc.

It is well known that a Class B amplifier is ideally capable of operating at 79% efficiency. With the amplifier output voltage at 75 Vrms, or ±106 Vpk, and the supply or rail voltage at ±115 V with respect to −50 Vdc, it is clear that the amplifier operates with very little headroom. That is the amplifier operates very close to the rail voltages. Therefore, the amplifier operates quite close to its theoretical maximum efficiency. As can be shown, if the amplifier is allowed to clip slightly, it can operate with an efficiency greater than 85%, while still allowing the ringing generator to meet the 1.20 minimum crest factor requirement.

So long as the current limit control circuit 14 is not active, the ringing generator 10 operates under the nominal conditions described above. The current limit control circuit receives current sensing input signals CS+ and CS− from the convertor. A current limiting reference voltage Vcr is also provided to the current limit control circuit. The circuit processes the current sensing input signals and internally produces a voltage proportional to the peak output currents of the convertor. That voltage is compared to Vcr, which is proportional to a predetermined maximum amplitude of ringing current. When the predetermined current threshold is exceeded, the current limit control circuit delivers the currents Irc (rail attenuator control current), and Isc (sinewave attenuator control current), proportional to the amount by which the predetermined threshold has been exceeded, to the supply voltage and sinewave current controlled attenuators CA2 and CA1.

Attenuator CA1 has the fixed sinusoidal voltage Vac delivered to its input, and under nominal conditions, delivers the voltage Vac' to the ringing amplifier at its nominal 1.50 Vrms value. Similarly, attenuator CA2 has the fixed reference voltage Vr delivered to its input, and under nominal conditions, delivers the voltage Vr' to the convertor's reference input 12c at its nominal 2.30 V value.

With currents Isc and Irc flowing, both the sinewave input voltage to the amplifier, and the voltage delivered to the convertor's reference input are reduced. The result is that both the amplifier's output voltage and supply voltage are reduced. Consequently, the power dissipated in the amplifier does not increase as would have been the case if only the AC output voltage had been reduced while leaving the supply voltage unchanged. When subjected to a sustained overload, the generator simply reduces its output power, but continues to deliver a waveform with the desired crest factor. The effect, as seen at the ringing load, is as if additional resistance had been inserted between the ringing generator and the load. Of course, no additional power is wasted as would have been the case if a resistor had actually been inserted.

It can be seen from the above description that the ringing generator delivers its peak power just before it goes into current limit, and delivers less when overloaded. The limiting threshold is set so that the generator is able to drive its maximum ringer load under worst case conditions at a minimum acceptable voltage plus a small margin.

Figures 2, 3:
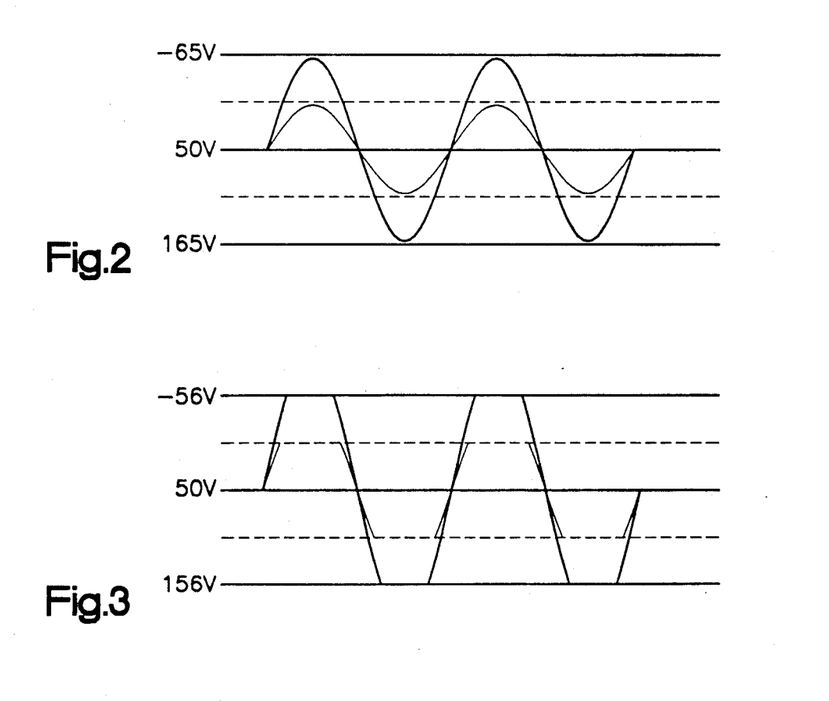
FIG. 2 shows the waveforms for the sinewave voltage output of the ringing generator in a first mode of operation wherein the output voltage amplitude is reduced once the current limiting threshold has been exceeded.
FIG. 3 shows the waveforms for the output voltage of the ringing generator in a second mode of operation wherein the output voltage is a clipped sinewave that still meets the crest factor requirements imposed on the generator.

FIG. 2 conceptually illustrates the behavior of the ringing generator 10 before and after the current limiting threshold has been exceeded. The solid sinewave and the solid horizontal lines above and below the sinewave represent the sinewave amplitude and amplifier supply voltages (convertor output voltages) when limiting has not been initiated. The dashed sinewave and horizontal lines depict the coordinated reduction in both sinewave output and supply voltage amplitude which assures that reduction of sinewave output level does not increase power dissipation in the amplifier's components as would have been the case in a more conventional amplifier. Note that the relation of the supply voltage amplitude to the sinewave amplitude is maintained during the reduction. By appropriate action of the controlled attenuators CA1 and CA2, an undistorted sinewave may be produced without increasing amplifier dissipation, over a quite wide range of output loads which drive the generator into the current limited region.

While the preferred ringing waveform is clearly an undistorted sinewave, a somewhat distorted waveform which complies with a given crest factor requirement is often acceptable, and will permit even greater efficiency and less dissipation in the amplifier while still producing ringing capability equivalent to an undistorted waveform having the same rms value. To that end, the initial relation of the supply voltage amplitude to the sinewave's virtual peak, and the action of the controlled attenuators may be arranged in such a way that a slightly clipped sinewave having the desired rms value, but with a controlled crest factor less than 1.41, is produced. FIG. 3 shows such a clipped waveform, and illustrates the coordinated output reduction action of the invention. As can be shown, employment of such a waveform can increase the ideal efficiency of the amplifier from 79% to nearly 90%, while still maintaining a minimum crest factor of 1.20.

Yet a third mode of operation is possible for the invention. With appropriate action of the controlled attenuators, an undistorted waveform with a crest factor of 1.41 may be provided under load conditions which do not initiate current limiting, but the crest factor may be reduced in a controlled way after the current limiting is initiated. All that is required is to attenuate the supply voltage at a rate faster than that of the sinewave input. This allows undistorted ringing up to some maximum power, followed by a somewhat slower current limiting initiated reduction in output ringing capability with increasing load than would have been the case if the undistorted waveform had been preserved; i.e., the reduction in crest factor allows more ringing capability with less dissipation than the undistorted waveform would have provided.

Figure 4:
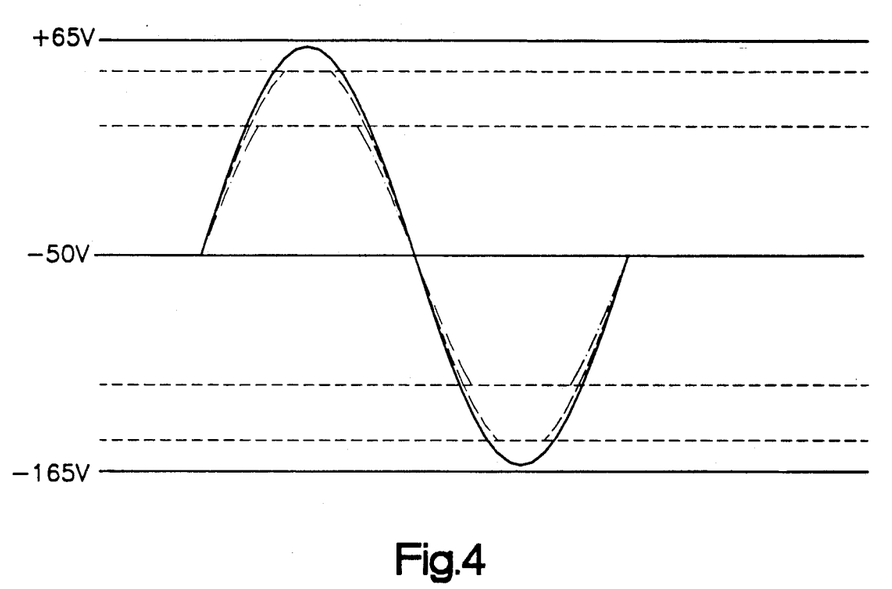
FIG. 4 shows the waveforms for the output voltage of the ringing generator in a third mode of operation wherein the supply voltage to the generator is reduced as the load on the generator output increases.

FIG. 4 illustrates the third mode of operation. The output waveform is initially undistorted and has a crest factor of 1.41. As the load on the generator increases, the supply voltage, indicated by the dashed horizontal lines, is seen to be reduced faster than the peak of the "target" sinewave. The resulting clipped sinewave, shown with dashed lines, are seen to have progressively decreasing crest factors with increasing overload.

Figure 5:
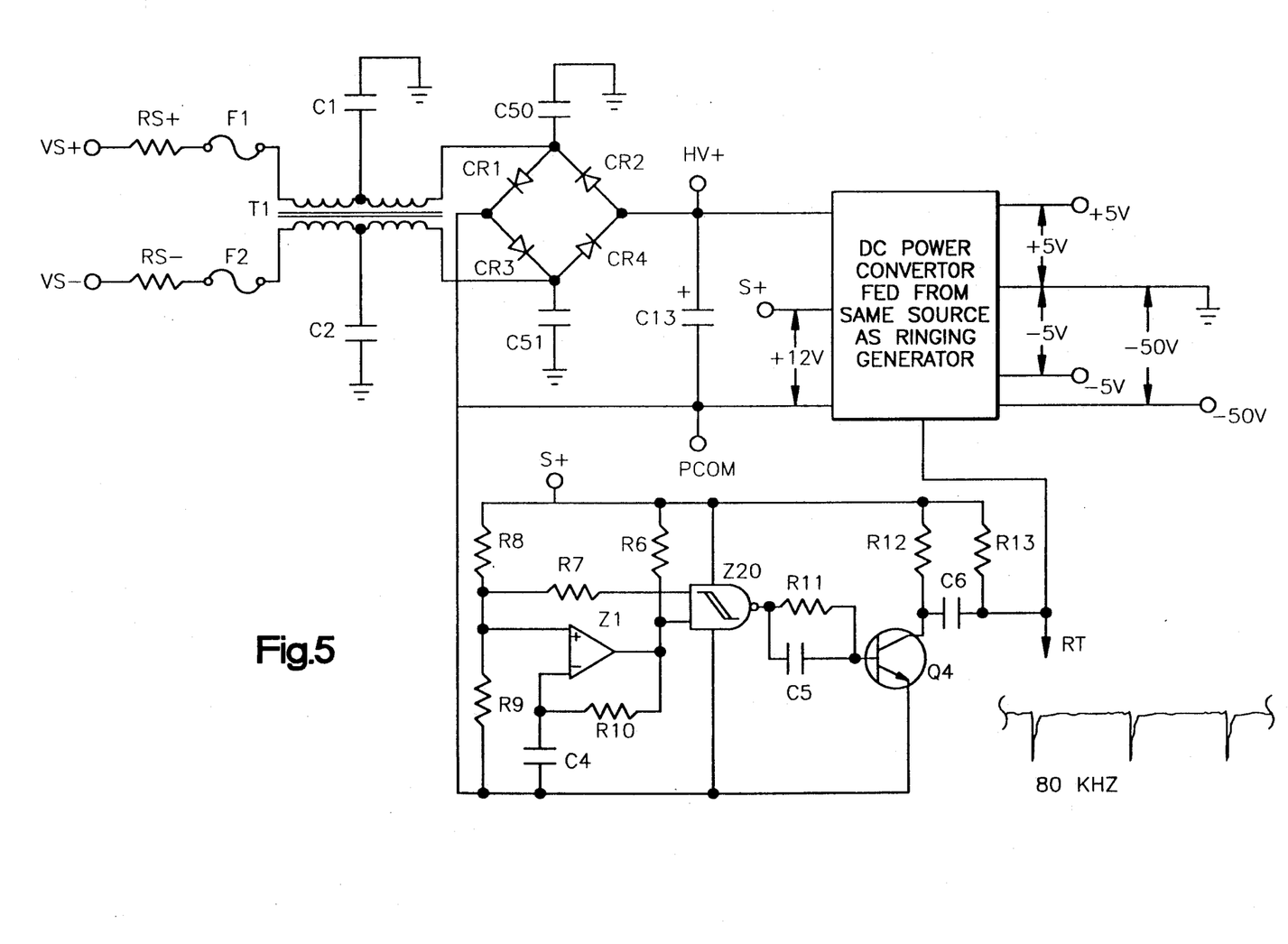
FIG. 5 is a block-schematic diagram showing an embodiment for the circuit which generates the switching frequency for the converter used in the ringing invention as well as the various operating voltages used in the generator.

FIG. 5 illustrates certain power feed, filtering, energy storage, and frequency generation aspects of the invention. The relation of ringing generator 10 of the one embodiment to other power local system power supplies fed from the same power source is also indicated.

Transformer T1 and capacitors C1, C2, C50 and C51 form a filter to prevent convertor switching components from being injected into the telephone cable plant. The fullwave rectifier bridge formed by diodes CR1 to CR4 makes it unnecessary for tip and ring polarity to be observed in the telephone plant. Fuses F1 and F2 are provided to prevent a fire hazard in the event that the input power conductors become crossed with those of the commercial AC power system. Capacitor C13 assures that the power feed circuitry presents a sufficiently low impedance to both ringing generator 10 and the DC power convertor fed from the same source.

The positive side of capacitor C13 is designated HV+, and acts as the positive supply voltage for circuitry associated with the high voltage side of the convertors fed from the line. The negative side of capacitor C13 is designated Pcom (primary common), and serves as a common point for circuitry associated with the high voltage side of the power convertors fed from the line. Capacitor C13 assures that a sufficiently low output impedance is offered to the convertors by the power feed and filtering circuits. Capacitor C13 also provides sufficient energy storage that only the average power required during application of ringing need be fed over the line, rather than the peak power of the ringing waveform, which for a sinewave, is twice as great.

The local system DC power convertor fed from the same source was required, in the application for which the one embodiment was developed, to produce approximately +12 Vdc with respect to Pcom, designated S+, and ±5 V and −50 Vdc with respect to local ground, for its own operation, and for use by the telephone system of which ringing generator 10 is part. Accordingly, ringing generator 10, in the one embodiment, also makes use of these voltage where appropriate.

The 80 KHz oscillator shown in FIG. 5 establishes the switching frequency for both the local system and ringing generator convertors. It is powered by S+, and delivers a squarewave to the ramp trigger circuitry formed by transistor Q4 and associated components. The ramp trigger signal (a portion of the waveform for which is shown in FIG. 5) is a narrow negative going pulse repeating at the switching frequency, which is used by both convertors to control ramp generators, which produce linearly rising ramps of voltage which are applied to one input of the pulse width modulators.

Figure 6A:
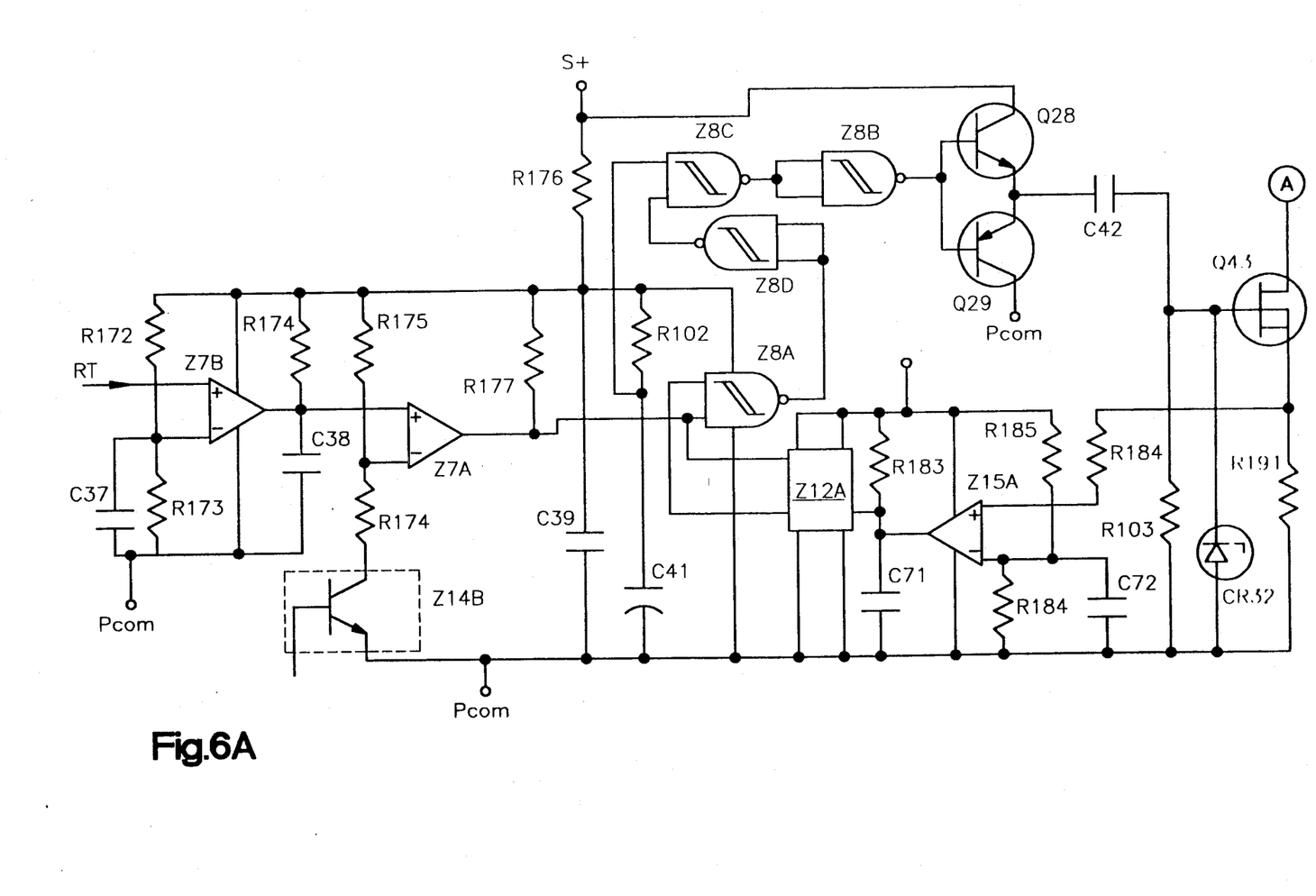
FIGS. 6a-6b show the embodiment of the DC to DC converter in the one embodiment of the present invention being described in this application.
Figure 6B:
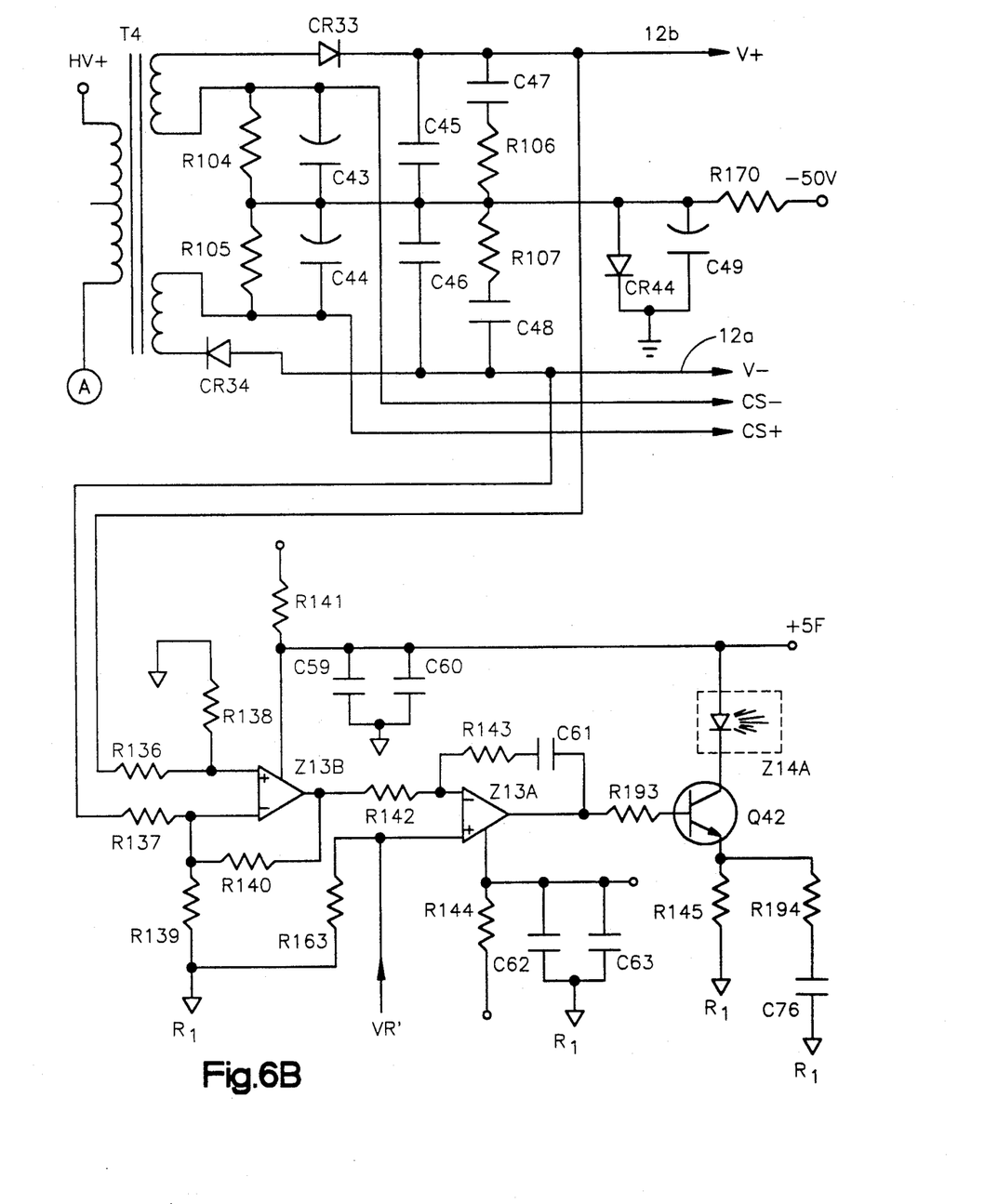

FIGS. 6a-6b shows the embodiment of the converter 12 used in the one embodiment of generator 10. The circuitry of convertor 12 is quite conventional, and should be well known to one skilled in the art. Therefore, convertor 12 will not be described in detail.

As described for FIG. 5, the ramp trigger signal is applied to the ramp generator formed by comparator Z7B and associated components. A nearly linearly rising ramp of voltage, with respect to Pcom, is produced across capacitor C38. The ramp is reset to zero by the ramp trigger signal.

The voltage ramp is applied to the non-inverting input of pulsewidth modulator comparator Z7A. The control voltage for the modulator is applied to the inverting input of Z7A, and is determined by the current flowing in the phototransistor Z14B of the opto-isolator Z14. The operation of the modulator is such that switching transistor Q43 is caused to turn off when the ramp generator is reset by the ramp trigger signal. Transistor Q43 turns back on at a later time, when the ramp amplitude reaches the voltage present at the modulator's inverting input. Thus, increasing current in Z14B causes the control voltage to be driven lower, transistor Q43 to turn on sooner, and the pulsewidth to be increased, thereby increasing energy transfer and output voltage of convertor 12.

The secondary of the power conversion transformer T4 is referenced to −50 Vdc, with respect to local ground, so that the voltages V− and V+ at the outputs 12a and 12b of convertor 12 are symmetrical about −50 Vdc. The −50 Vdc reference voltage is applied to the output circuitry of convertor 12 through 1000 ohm resistor R170 so that momentary high −50 V currents during ringtrip cannot be taken from the DC power convertor associated with the local telephone system. Capacitor C49 supplies the necessary energy storage to stabilize the −50 Vdc reference voltage delivered to converter 12 output circuitry during those momentary transients.

The differential voltage present at outputs 12a and 12b is delivered to a differential voltage sensing amplifier formed by Z13B and associated components. The voltage sensor drives the feedback input of the rail voltage error amplifier formed by Z13A and associated components, and delivers thereto a local ground referenced voltage equal to one one hundredth (1/100) of the sensed differential voltage. Clearly then, convertor 12 operates with a voltage gain of 100, with respect to the local ground referenced voltage Vr' delivered to input 12c of convertor 12.

The error amplifier drives the opto-isolator driver formed by Q42 and associated components, which consequently controls the current in light emitting diode (LED) Z14A of opto-isolator Z14, thus closing the feedback loop. In the application for which the one embodiment was developed, for safety and other reasons, it was not acceptable to have a common DC ground reference between the high voltage input circuitry of convertor 12 and its output circuitry. Therefore, it was necessary to use optical coupling in the feedback loop even though those skilled in the art will recognize that the use of that type of coupling rather than direct coupling complicates the design of the convertor.

Resistors R104 and R105, being in series with the secondary windings of transformer T4, produce voltage drops across themselves proportional to current flow in the transformer secondary windings. The voltages so produced are filtered by capacitors C44 and C45, and are delivered to current limit control circuit 14 (see FIG. 8) as the voltages Cs+ and Cs−. Since those voltages are returned to −50 Vdc they contain a large common mode component. Even so, the differential voltage between Cs+ and Cs− is proportional to the output current of convertor 12.

Switching transistor current sensing resistor R191, flip-flop Z12A, comparator Z15A and their associated components serve to turn off the switching transistor on a pulse to pulse basis if a predetermined transistor current is exceeded. This has come to be known as current mode programming. In the one embodiment the predetermined value of current was approximately 1.2 amperes.

Schmitt trigger NAND gates Z8A through D buffer the, pulsewidth modulator signal before it is applied to the MOSFET driver formed by transistors Q28 and Q29. The RC circuit formed by resistor R102 and capacitor C41, and connected to gate Z8C assures that on power-up, convertor 12 does not start until the DC power supply fed from the same source has had time to stabilize.

Figure 7:
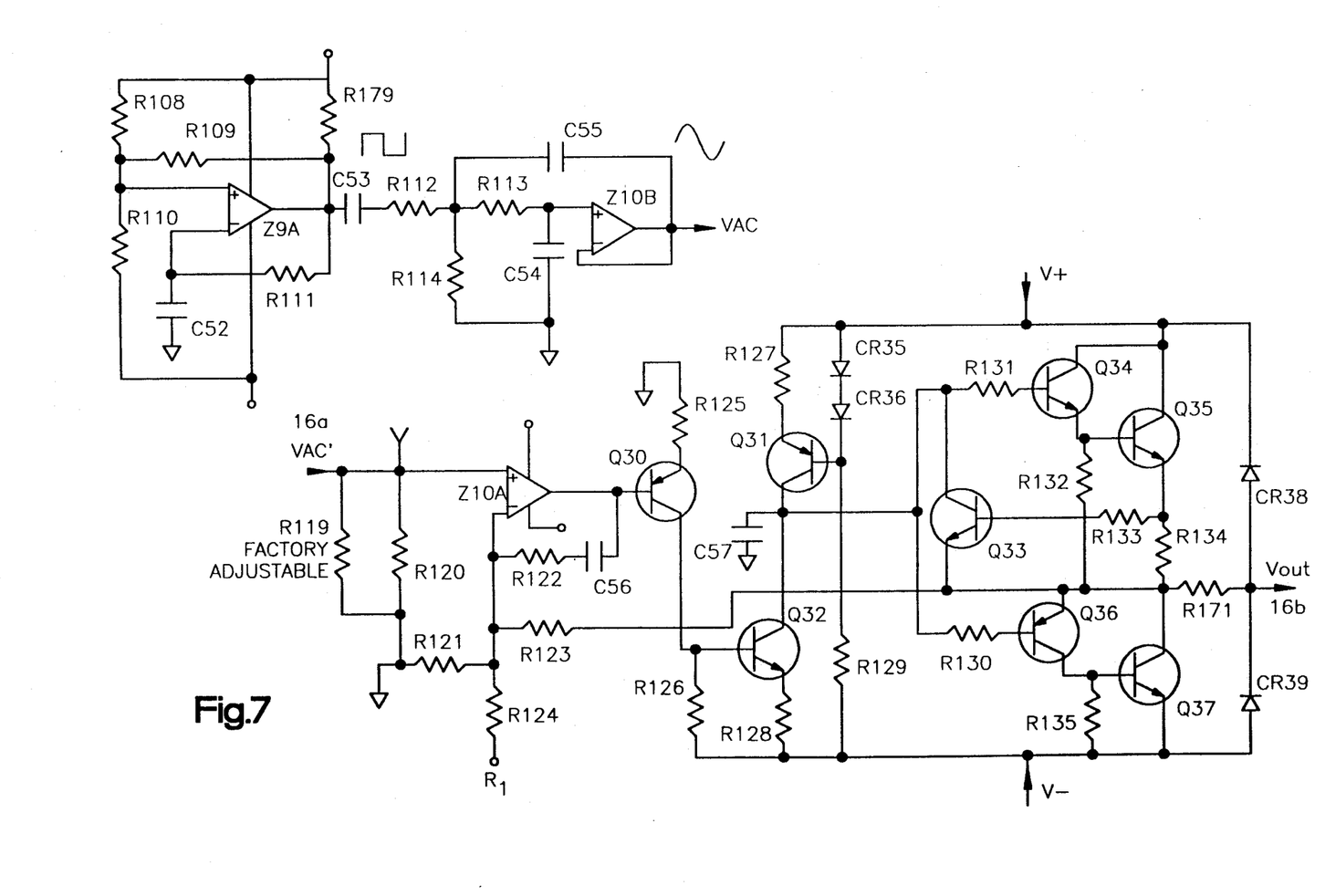
FIG. 7 shows an embodiment for the source that provides the ringing signals to the ringing generator as well as the embodiment for the ringing amplifier in the one embodiment of the present invention being described in this application.

FIG. 7 shows the embodiments of the 20 Hz low level signal source and the amplifier 16 used in the one embodiment. Comparator Z9A and associated components form an astable multivibrator with its frequency determined by resistor R111 and capacitor C52. The multivibrator runs with a duty cycle very close to fifty percent (50%). The 20 Hz squarewave output is AC coupled by capacitor C53 to the 20 Hz filter which follows.

Resistors R112 and R114 form an input voltage divider for the 20 Hz filter. The divider provides 10 dB loss to the squarewave input, and has an equivalent resistance of 295 Kohms. Resistor R114, in series with resistor R113, also provides a bias current path and DC reference for operational amplifier Z10B. The divider equivalent resistance, R113, C54 and C55, and the operational amplifier form a two pole Tschebyscheff low pass filter with a corner frequency of 25 Hz, and a passband ripple of 2 dB. The filter attenuates the third harmonic of 20 Hz (60 Hz) by 18 dB, and the fifth harmonic (100 Hz) by 28 dB. After the 20 Hz squarewave developed by the oscillator traverses the filter, it emerges as Vac at the filter output. The voltage Vac, a reasonably clean sinewave at approximately 1.75 Vrms, is delivered to input of the 20 Hz attenuator CA1 (see FIG. 8).

Resistors R121 through R135, along with resistor R171, operational amplifier Z10A, diodes CR35, CR36, CR38 and CR39, capacitors C56 and C57, and transistors Q30 through Q37 form ringing amplifier 16. Amplifier Z10A functions as an error amplifier, with the 1.5 Vrms 20 Hz sinewave applied to the non-inverting input by 20 Hz attenuator CA1 serving as the reference voltage. The output circuitry of amplifier 16 is seen to be directly powered by voltages V− (−165 V) and V+ (+65 V), which appear at outputs 12a and 12b of convertor 12.

The output of the ringing amplifier, so far as feedback action is concerned, is taken at the collector of transistor Q37, and the feedback loop is closed back to the error amplifier's error input by the 1.00 Mohm resistor R123. For AC signals, the feedback fraction is determined by the voltage divider formed by feedback resistor R123 and the parallel combination of resistors R121 and R124. Since the value of the parallel combination is 20.4 Kohms, the reciprocal of the feedback fraction is easily calculated to be 50, which is the closed loop gain of the ringing amplifier from its reference input to the collector of transistor Q37.

By taking the Thevenin equivalent of the voltage divider formed by resistors R121 and R124, the divider is seen to introduce at the error amplifier's inverting input an equivalent DC voltage of +1.02 V through an equivalent resistance of 20.4 Kohms. Since the closed loop gain from the hypothetical +1.02 V point to the collector of transistor Q37 is −49.0, the presence of the divider between +5 V and ground is seen to produce a DC voltage of −50 V at the collector of Q37. Clearly then, since the nominal AC input at the error amplifier's reference terminal is 1.50 Vrms at 20 Hz, and the gain from that terminal is 50.0, the nominal output will be a 20 Hz sinewave at 75 Vrms, centered about −50 Vdc. Resistor R122 and capacitor C56 provide local feedback for the error amplifier. With such feedback the error amplifier has a DC gain of approximately 75 dB, decreasing to 5 dB at about 25 KHz, flat thereafter to approximately 200 KHz, and decreasing from that frequency at 20 dB per decade.

Unity ratio resistors R125 and R126 and transistor Q30 form a level translation and inversion stage whose gain is −1.0 because of the unity ratio of the resistors. The output of the stage is taken at the base of transistor Q32 with respect to the voltage V−. Resistors R127 to R129 in combination with diodes CR35 and CR36, capacitor C57, and transistors Q31 and Q32 form a voltage amplifier with an active load. The amplifier is also referred to the V− voltage. Resistors R127 and R129 along with diodes CR35 and CR36 and transistor Q31 specifically form an approximately one milliampere current source which serves as an active load for voltage amplifier transistor Q32. Resistor R129 biases CR35 and CR36 on with approximately fifty microamperes of current. As is well known, the output resistance of a discrete transistor such as Q31, operating at one milliampere is typically 200 Kohms. Since R32, the emitter resistor of Q32, is 499 ohms, the DC gain of the voltage amplifier is approximately 400, or 52 dB.

Capacitor C57 establishes the voltage amplifier's 3 dB down point at approximately 1600 Hz. The ringing amplifier's remaining stages furnish current gain only. It can thus be seen that the composite amplifier's open loop voltage gain is approximately 127 dB. At a frequency of about 25 Hz, the open loop gain is down to approximately 57 dB and remains flat thereafter until about 1600 Hz where the amplifier's dominant pole is established by capacitor C57. Therefore, it is expected that the closed loop gain will be down 3 dB at about 64 KHz. Transistors Q34 and Q35 form a Darlington pair, and provide current gain when the ringing amplifier is sourcing current. The common collectors of the two transistors are connected to the positive power supply voltage V+ of amplifier 16. Resistor R132 provides degeneration at the base of output transistor Q35, and assures that at least 50 microamperes or more of bias current flows in Q34 when Q35 is conducting.

The composite structure formed by transistors Q36 and Q37 is equivalent to a very high gain ($\beta$=approximately 1000 PNP transistor. Resistor R135 degenerates the base of transistor Q37, and assures that at least 50 microamperes or more flows in Q36 when Q37 is conducting. The composite structure acts as the output transistor when the ringing amplifier is sinking current. Nearly all of the current, of course, is sunk by Q37. Current sensing resistor R134 is inserted in the output current path of Q35. If the output current of Q35 exceeds approximately 300 milliamperes, transistor Q33 turns on and steals base current from Q34, thus preventing further increase in output current. This provides a means of limiting current to a finite value if due to a momentary transient both Q35 and Q37 are simultaneously conducting.

Diodes CR38 and CR39 protect the output transistors from reverse surges. The 51 ohm, 5 W resistor R171 serves to partially isolate the output of the amplifier from faults until current limiting (see FIG. 8) can become effective, i.e., even with a dead short presented to the generator's output terminal, the amplifier sees at least a 51 ohm load. Resistors R130 and R131 protect the base emitter junctions of Q34 and Q36 from transients.

Figure 8:
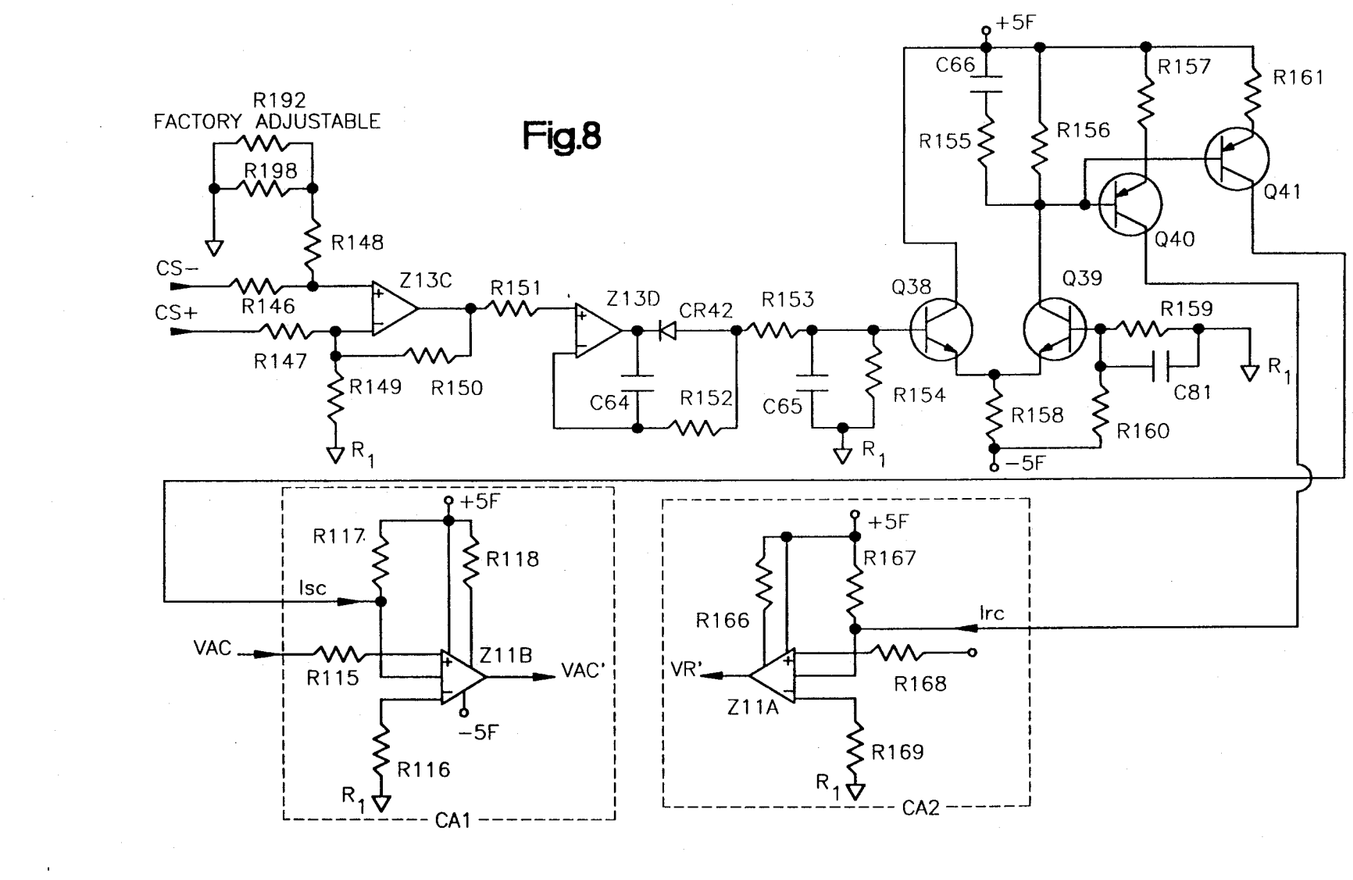
FIG. 8 shows the embodiments for the current limit control circuit and the controllable attenuators in the one embodiment of the present invention being described in this application.

FIG. 8 shows the embodiments for the current limit control circuit 14 and the controlled attenuators CA1 and CA2 used in the one embodiment.

Resistors R104 and R105 (see FIG. 7), R146 through R150, R192, R198, capacitors C43 and C44 (see FIG. 7), and operational amplifier Z13C form the ringing current sensor. Resistors R104 and R105 function as sensing resistors, producing voltages with respect to −50 Vdc which are proportional to the currents flowing in the positive and negative supply rails, respectively. Capacitors C43 and C44 partially filter the sensed voltages, and additionally serve as bypass capacitors. The negative going voltage proportional to positive rail current is passed to the current sensing amplifier as signal Cs−; the positive going voltage proportional to negative rail current is passed as signal Cs+.

Amplifier Z13C and its associated components form a differential amplifier which operates with a voltage gain of 1.13. Supply rail current results in negative going voltages at the amplifier output. The amplifier output voltage due to the sensed current at the limiter threshold is about −1.25 V. Since the amplifier circuit is subjected to a common mode input voltage of −51 V, an intolerably good component match of the differential amplifier circuit's resistor values would be required to prevent the unrejected common mode input voltage from having a significant effect on the amplifier's output voltage, and consequently on the threshold of current limiting. Accordingly, factory adjustable resistor R192 is selected to set the threshold of current limiting. In the one embodiment, the threshold was set so that the maximum current which the ringing generator will deliver to a load was approximately 70 mA rms. The current sensor's output is delivered to the peak current detector.

Resistor's R151 through R154, capacitors C64, C65, diode CR42, and operational amplifier Z13D form the peak current detector. The circuit formed by R151, R152, CR42, and Z13D functions as an ideal negative rectifier. For an input above ground, Z13D's output is driven abruptly positive, CR42 is reverse biased, and output voltage to a resistive load would be zero. For inputs below ground, Z13D's output is driven abruptly negative until CR42 conducts, at which time a feedback loop is closed through R152, and the negative input voltage is reproduced at the anode of CR42 with unity gain. The ideal rectifier circuit's output is filtered by R153, R154 and C65. In the one embodiment, the attack time constant, determined by R153 and C65, was 44 msec. The decay time constant, determined by C65 and R154 in parallel with the input resistance to transistor Q38, was approximately 1.30 sec. At any given time, the voltage at the base of Q38, which is the input to the current error amplifier, is proportional to the peak sensed current, with a reasonably fast attack time, and a quite long decay time. For a repetitive 20 Hz current, a negative DC voltage is produced, with a small 40 Hz ripple component superimposed.

Transistors Q38 and Q39, resistors R156, R158 to R160, and capacitors C66 and C81 form the current error amplifier of circuit 14. The reference voltage Vcr for the amplifier is established at nominally −1.00 V by the divider formed by R159 and R160. The divider output is filtered by C81. Under zero current conditions, Q39 does not conduct, the output voltage at the collector of Q39 is +5 V, and the bias current is set at approximately 285 uA by the ground applied to Q38's base through R154. At the threshold point, when the bases of Q38 and Q39 are both at approximately −1 V, the bias current of the amplifier is approximately 225 uA.

When the voltage at the base of Q38 falls, due to the detection of the ringing generator current, the bias current decreases, and eventually, as the reference voltage is approached, Q39 begins to conduct. With Q39 conducting, the voltage at the collector of Q39 begins to fall because of the voltage drop in load resistor R156. When the collector current of Q39 has increased sufficiently, to about 25 uA, the controlled attenuator driver current sources formed by transistors Q40 and Q41 and resistors R157 and R161, respectively, begin to conduct. The voltage to current gain of Q40 is inversely proportional to the resistance of R157, while the voltage to current gain of Q41 is determined by the resistance of R161.

Resistors R163, R166 to R169, and transconductance amplifier Z11A form the rail attenuator CA2, and reference voltage circuit for converter 12. The transconductance amplifier is a low cost Gilbert multiplier. It is the nature of such a device that its output current is ideally equal to the product of its input (signal) current and its amplifier bias current, divided by its linearizing diode current. By varying the bias current, the device can perform analog multiplication, while varying the linearizing diode current allows the device to perform analog division.

In attenuator CA2, the input current is determined primarily by the quotient of +5 V and the sum of the resistance of R168 and R169. The bias current is determined by the resistance of R166; the linearizing diode current by the resistance of R167. In the one embodiment the resistance of resistors R166 and R167 are equal. Therefore, they cancel in the input/output current relationship stated in the paragraph above and have no effect on the output current. The output voltage Vr, is simply the output current times the resistance of resistor R163 (at the reference input to convertor 12 in FIG. 6). The resistance of R163 may be chosen to establish the proper reference voltage to convertor 12 when current limiting is not active. In the first mode of operation of the ringing generator, that voltage is +2.30 V.

Under normal conditions, no additional current flows by way of signal Irc. When an overcurrent condition occurs, additional current is injected into the linearizing diode input (pin 1) by the rail attenuator driver previously described. With the additional current injected, the reference voltage Vr' produced by the attenuator is reduced, and as a consequence, the ringing amplifier supply rails are reduced from their nominal ±115 V value with respect to −50 V.

Resistors R115 to R120, transconductance amplifier Z11B and capacitor C77 form 20 Hz attenuator CA1. The 20 Hz attenuator operates in exactly the same way as the rail attenuator CA2 and reference circuit except that the input to the attenuator, applied through R115, is a 20 Hz sinewave, rather than a DC voltage. Current from the 20 Hz attenuator driver by way of signal Isc causes the level of the 20 Hz delivered at the attenuator's output to be reduced when the ringing generator's output is being current limited. Factory adjustable resistor R119 (see) provides a means to adjust the 20 Hz sinewave input level Vac' to ringing amplifier 16 to the desired input voltage under normal conditions, which for the ringing generator's first mode of operation is 1.5 V rms.

The three modes of operation of ringing generator 10 shown in FIGS. 2 to 4 will now be described with reference to FIG. 8.

In order to describe that operation the voltage across the resistors R157 and R161 of the current limit control circuit 14 will be defined as Vc (control voltage). Since the bases of Q40 and Q41 are common, it is clear that at least ideally R157 and R161 are subjected to equal voltage. When the output of generator 10 is not being reduced, Vc is equal to zero volts. Clearly, the control currents, Irc and Isc, are equal to Vc divided by the resistances of R157 and R161, respectively.

As described above, the transconductance amplifiers Z11A and Z11B of attenuators CA2 and CA1, respectively both function as Gilbert multipliers. Their function can be characterized by the following equation:

$$I_{out} = I_{in}\left(\frac{I_b}{I_d}\right) \tag{1}$$

where Iin is the input current to the amplifier, Ib is the amplifier bias current and Id is the amplifier linearizing diode current.

In attenuators CA2 and CA1 the linearizing diode currents are those which flow into pins 1 and 8 of Z11A and Z11B, respectively and the bias currents are those which flow into pins 3 and 6 of the amplifiers. The amplifiers are monolithic devices cut as a single unit from the same silicon wafer. Accordingly, their parameters are quite well matched. The bias currents, and under normal conditions the linearizing diode currents as well, are thus determined by the ±5 V supply voltages, which are very well controlled, and the resistances of the resistors connected between the supply voltage designated +5 F (filtered +5 V) and the aforementioned transconductance amplifier pins, and by the well matched internal parameters (forward diode drops) of the transconductance amplifiers. Since the resistors are all of equal resistance, it follows that the bias currents, and under normal conditions the linearizing diode currents as well, are all equal.

When current limiting is active, the currents Isc and Irc, which produce the output reduction effect, are simply added to the existing linearizing diode currents. For the moment, the added current is generically denoted as Ic. The transconductance amplifier, of course, must respond to the total current which flows into its linearizing diode terminals. Accordingly equation (1) can be rewritten as:

$$I_{out}' = I_{in}\left(\frac{I_b}{I_d + I_c}\right) \tag{2}$$

Id in equation (1) has been replaced by Id+Ic. The prime on the output current indicates that the output current has been modified by current limiting action.

Now denoting generically as Rc, emitter resistors R157 and R161 of transistors Q40 and Q41 and recalling that control current Ic is simply the quotient of Vc and Rc, equation (2) can be rewritten as:

$$I_{out}' = I_{in}\left(\frac{I_b}{I_d + \frac{V_c}{R_c}}\right) \tag{3}$$

Equation (3) can be manipulated to give:

$$I_{out}' = I_{in}\left(\frac{I_b}{I_d}\right)\left(\frac{1}{1 + \frac{V_c}{(I_d)R_c}}\right) \tag{4}$$

In equation (4), the first two terms to the right of the equals sign are recognized as the right hand side of equation (1). The last term is a result of the current limiting action.

The initial absolute peak value of the supply voltages V+ and V− with respect to 50 V is denoted by V+ and the target peak value of the output sinewave is denoted by Vp. Since the input/output characteristics of both amplifier 16 and convertor 12 are ideally linear, and since the components of circuit 14 and convertor 12 have been chosen to produce the desired initial supply voltage and sinewave output amplitudes, equation (5) for the controlled supply voltage amplitude, and equation (6) for the controlled target sinewave amplitude are:

$$V_+' = (V_+)I_{in}\left(\frac{I_b}{I_d}\right)\left(\frac{1}{1 + \left(\frac{V_c}{(I_d)R157}\right)}\right) \tag{5}$$

$$V_p' = (V_p)I_{in}\left(\frac{I_b}{I_d}\right)\left(\frac{1}{1 + \left(\frac{V_c}{(I_d)R161}\right)}\right) \tag{6}$$

Dividing equation (5) by equation (6) gives the equation for the ratio of controlled supply voltage amplitude to controlled target peak sinewave amplitude as:

$$\frac{V_+'}{V_p'} = \left(\frac{V_+}{V_p}\right)\frac{\left(1 + \left(\frac{V_c}{(I_d)R161}\right)\right)}{\left(1 + \left(\frac{V_c}{(I_d)R157}\right)\right)} \tag{7}$$

The leftmost term on the right hand side of equation (7) is recognized as the initial ratio of supply voltage amplitude to target sinewave amplitude. The second term is due to the current limiting action.

Examining equation (7), it is easy to see that, at least ideally, if it is desired to preserve the initial ratio of supply voltage amplitude to sinewave target peak amplitude, resistors R157 and R161 should have equal resistances. In principle, this choice corresponds to both the first mode of operation, in which it is desired to initially produce an undistorted sinewave, and maintain a crest factor of 1.41 with current limiting active, and to the second mode of operation, where it is desired to produce a clipped sinewave, with a crest factor less than 1.41, but to maintain that crest factor with limiting active.

Note that Vp denotes the target peak voltage of the sinewave and not necessarily the peak value actually attained. In the second mode of operation, Vp is deliberately chosen to be greater than $V_+$ to produce the desired clipped sinewave. In the first mode of operation, of course, Vp is the peak value of the output sinewave. In either case, at least ideally, setting R157 and R161 equal preserves the ratio of $V_+$ to Vp while providing the desired coordinated output voltage reduction.

Further examining equation (7) it can be seen that if the resistance of R157 is set to be less than the resistance of R161, the aforementioned ratio is reduced with the onset of limiting, and the third mode of operation, in which an undistorted sinewave is initially produced, but clipping occurs with the onset of limiting, and increases progressively with increased overload, is realized.

To produce the second mode of operation with a given rms output voltage and crest factor, the required value of R163 in convertor 12 (FIG. 6) is generally different than that required to produce the first mode of operation with the same rms output voltage.

The current limiting action which takes place in generator 10 when an overload is applied to the generator output will now be described. The performance of the one embodiment will also be described.

When an overload is applied to the output of generator 10, the previously described action of the current limit control circuit causes control currents Irc and Isc to be delivered to the linearizing diode current inputs of controlled attenuators CA2 and CA1, where they are added to the existing currents sourced through resistors R167 and R117. The presence of the additional linearizing diode currents causes the output currents of the controlled attenuators to be reduced in such proportion as to produce one of the three modes of output reduction as has been described herein.

It should be clear that the current error amplifier formed by transistors Q38 and Q39 and associated components closes a feedback loop, and that equilibrium is reached when the voltage delivered to the current error amplifier's feedback input (the base of Q38) slightly exceeds the voltage delivered to the error amplifier's reference input (the base of Q39), and that increasing overload causes a corresponding reduction in output voltage by negative feedback action. Capacitor C66, and resistors R155 and R156 provide frequency compensation for the current limit control feedback loop.

In the one embodiment, with R161's resistance equal to 10 Kohms, R157's resistance equal to 10 Kohms, and R163's resistance equal to 14.3 Kohms, the first mode of operation was produced, with the initial sinewave amplitude equal to 75 Vrms, and the supply voltages V− and V+ of amplifier 16 equal to ±113 V.

The second mode of operation was produced with an initial rms voltage of 75 Vrms and with a crest factor of approximately 1.27, when R161 was equal to 10 Kohms, R157 equal to 10 Kohms, and R163 equal to 12.1 Kohms. Resistor R119 was adjusted to trim the crest factor.

The third mode of operation was produced with R161 equal to 10 Kohms, R157 equal to 7.87 Kohms, and R163 equal to 14.3 Kohms. The crest factor was reduced from 1.41 to approximately 1.30 when the output voltage was reduced from 75 Vrms to 50 Vrms.

It is to be understood that the description of the preferred one embodiment is intended to be only illustrative, rather than exhaustive, of the present invention. Those of ordinary skill will be able to make certain additions, deletions, and/or modifications to that embodiment of the disclosed subject matter without departing from the spirit of the invention or its scope, as defined by the appended claims.

What is claimed is:

1. An electronic generator for providing a ringing signal to a load, said generator comprising:
   a) first means responsive to a reference voltage for generating a regulated differential DC voltage at a fixed multiple of said reference voltage, said differential DC voltage being symmetrical about a DC bias voltage;
   b) second means responsive to a first signal and a second signal for generating a control signal, said first signal proportional to a predetermined maximum amplitude of current permitted to flow in said load, said second signal proportional to current actually flowing in said load, said control signal having an amplitude proportional to an amount by which said second signal exceeds said first signal;
   c) third means for providing a sinusoidal signal and said reference voltage, said sinusoidal signal having a desired ringing frequency and a predetermined amplitude associated therewith, and said reference voltage at a predetermined amplitude associated therewith, said third means responsive to said control signal for providing both said sinusoidal signal and said reference voltage at amplitudes attenuated from the associated one of said predetermined amplitudes by an amount proportional to said control signal amplitude; and
   d) means connected to receive said regulated differential DC voltage for amplifying said sinusoidal signal to provide said ringing signal as an AC signal having a crest factor, said AC signal symmetrical about said DC bias voltage, said AC signal having;
      i) a predetermined amplitude and said crest factor equal to a first predetermined crest factor when said third means provided said sinusoidal signal and said reference voltage both have said associated one of said predetermined amplitudes; and
      ii) a second amplitude which is reduced from said predetermined amplitude and said crest factor which is equal to or less than said first predetermined crest factor but greater than a second predetermined crest factor when said third means provided said sinusoidal signal and said reference voltage both have the associated one of sad attenuated amplitudes.

2. The generator of claim 1 wherein said crest factor is said first predetermined crest factor when said third means provided said sinusoidal signal and said reference voltage both have said attenuated amplitudes.

3. The generator of claim 2 wherein said AC signal is essentially sinusoidal and said first predetermined crest factor is about 1.41,
   said amplifying means having a peak power dissipation when said second signal proportional to current actually flowing in said load first equals said first signal proportional to predetermined maximum amplitude of current permitted to flow in said load, said amplifying means having a second power dissipation which is less than or equal to said peak power dissipation when said third means provided said sinusoidal signal and said reference voltage both have said attenuated amplitudes and said second signal exceeds said first signal.

4. The generator of claim 2 wherein said AC signal is essentially a clipped sinusoid and said first predetermined crest factor is less than 1.41.

5. The generator of claim 1 wherein said AC signal has said crest factor which is less than said first predetermined crest factor but greater than a second predetermined crest factor, and said second amplitude which is reduced from said predetermined amplitude when said third means provided said sinusoidal signal and said reference voltage both have said attenuated amplitudes,
   said amplifying means having a peak power dissipation when said second signal proportional to current actually flowing in said load first equals said first signal proportional to predetermined maximum amplitude of current permitted to flow in said load, said amplifying means having a second power dissipation which is less than or equal to said peak power dissipation when said third means provided said sinusoidal signal and said reference voltage both have said attenuated amplitudes and said second signal exceeds said first signal,
   said third means is responsive to said control signal for providing said reference voltage with an amplitude attenuated at a faster rate from said reference voltage predetermined amplitude than a rate at which said third means is providing said sinusoidal signal with an amplitude attenuated from said sinusoidal signal predetermined amplitude, said AC signal crest factor and amplitude decreasing by an amount proportional to the attenuation in said predetermined amplitudes of said reference voltage and said sinusoidal signal, respectively.

6. The generator of claim 5 wherein said first predetermined crest factor is about 1.41 and said AC signal is essentially sinusoidal when said third means provided said sinusoidal signal and said reference voltage both have said associated one of said predetermined amplitudes, and said AC signal is an essentially clipped sinusoid when said third means provided said sinusoidal signal and said reference voltage both have said attenuated amplitudes.

7. An electronic generator for providing a ringing signal to a load, said generator comprising:
   a) first means responsive to a reference voltage for generating a regulated differential DC voltage at a fixed multiple of said reference voltage, said differential DC voltage being symmetrical about a DC bias voltage;
   b) second means responsive to a first signal and a second signal for generating a control signal, said first signal proportional to predetermined maximum amplitude of current permitted to flow in said load, said second signal proportional to current actually flowing in said load, said control signal having an amplitude proportional to an amount by which said second signal exceeds said first signal;
   c) third means for providing both a sinusoidal signal and said reference voltage, said sinusoidal signal having a desired ringing frequency and a predetermined amplitude associated therewith, and said reference voltage at a predetermined amplitude associated therewith, said third means responsive to said control signal for providing both said sinusoidal signal and said reference voltage at amplitudes attenuated from the associated one of said predetermined amplitudes by an amount proportional to said control signal amplitude; and
   d) means connected to receive said regulated differential DC voltage for amplifying said sinusoidal signal to provide said ringing signal as an AC signal having a crest factor, said AC signal symmetrical about said DC bias voltage, said AC signal having:
      i) a predetermined amplitude and said crest factor equal to a first predetermined crest factor when said third means provided said sinusoidal signal and said reference voltage both have said associated one of said predetermined amplitudes; and
      ii) said first predetermined crest factor and a second amplitude which is reduced from said predetermined amplitude when said third means provided sinusoidal signal and said reference voltage both have said attenuated amplitudes.

8. The generator of claim 7 wherein said AC signal and said first predetermined crest factor is about 1.41,
   said amplifying means having a peak power dissipation when said second signal proportional to current actually flowing in said load first equals said first signal proportional to predetermined maximum amplitude of current permitted to flow in said load, said amplifying means having a second power dissipation which is less than or equal to said peak power dissipation when said third means provided said sinusoidal signal and said reference voltage both have said attenuated amplitudes and said second signal exceeds said first signal.

9. The generator of claim 7 wherein said AC signal is essentially a clipped sinusoid and said first predetermined crest factor is less than 1.41.

10. An electronic generator for providing a ringing signal to a load, said generator comprising:
   a) first means responsive to a reference voltage for generating a regulated differential DC voltage at a fixed multiple of said reference voltage, said differential DC voltage being symmetrical about a DC bias voltage;
   b) second means responsive to a first signal and a second signal for generating a control signal, said first signal proportional to a predetermined maximum amplitude of current permitted to flow in said load, said second signal proportional to current actually flowing in said load, said control signal having an amplitude proportional to an amount by which said second signal exceeds said first signal;
   c) third means for providing a sinusoidal signal and said reference voltage, said sinusoidal signal having a desired ringing frequency and a predetermined amplitude associated therewith, and said reference voltage at a predetermined amplitude associated therewith, said third means responsive to said control signal for providing both said sinusoidal signal and said reference voltage at amplitudes attenuated from the associated one of said predetermined amplitudes by rates proportional to said control signal amplitude, said reference voltage amplitude attenuated at a faster rate from said reference voltage predetermined amplitude than a rate at which said sinusoidal signal amplitude is attenuated from said sinusoidal signal predetermined amplitude; and
   d) means connected to receive said regulated differential DC voltage for amplifying said sinusoidal signal to provide said ringing signal as an AC signal having a crest factor, said AC signal symmetrical about said DC bias voltage, said AC signal having:
      i) a predetermined amplitude and said crest factor equal to a first predetermined crest factor when said third means provided said sinusoidal signal and said reference voltage both have said associated one of said predetermined amplitudes; and ii) a second amplitude which is reduced from said predetermined amplitude, and said crest factor which is reduced from and thus less than said first predetermined crest factor but greater than a second predetermined crest factor when said third means provided said sinusoidal signal and said reference voltage both have said attenuated amplitudes, said reduction in said crest factor and said AC signal amplitude proportional to the attenuation in said amplitudes of said reference voltage and said sinusoidal signal, respectively, said amplifying means having a peak power dissipation when said second signal proportional to current actually flowing in said load first equals said first signal proportional to predetermined maximum amplitude of current permitted to flow in said load, said amplifying means having a second power dissipation which is less than or equal to said peak power dissipation when said third means provided said sinusoidal signal and said reference voltage both have said attenuated amplitudes and said second signal exceeds said first signal.

11. The generator of claim 10 wherein said first predetermined crest factor is about 1.41 and said AC signal is essentially sinusoidal when said third means provided said sinusoidal signal and said reference voltage both have said associated one of said predetermined amplitudes, and said AC signal is an essentially clipped sinusoid when said third means provided said sinusoidal signal and said reference voltage both have said attenuated amplitudes.

* * * * *